Aug. 3, 1954  R. N. ANDERSON  2,685,156
SCRAPER HOLDER
Filed June 8, 1953
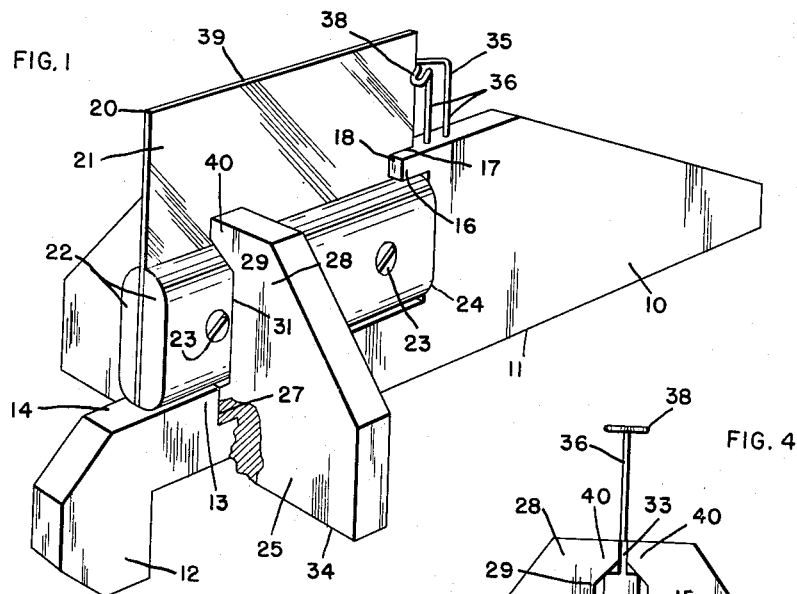
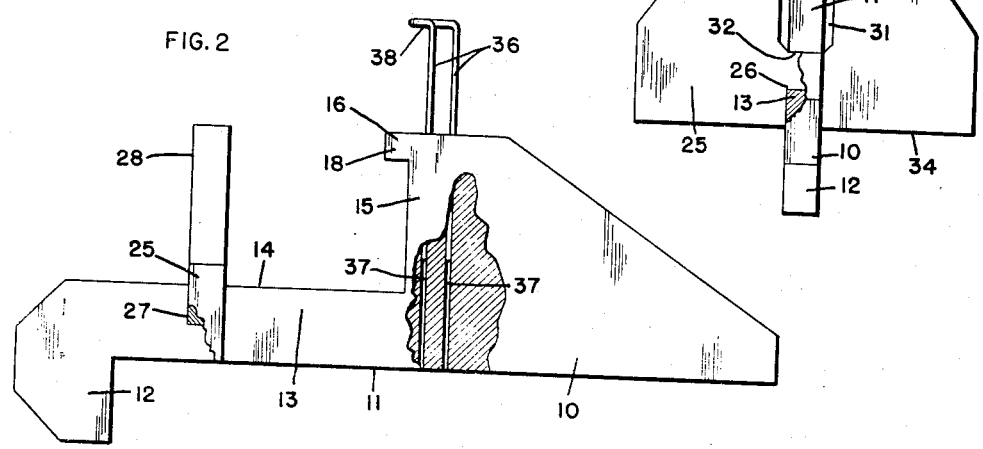
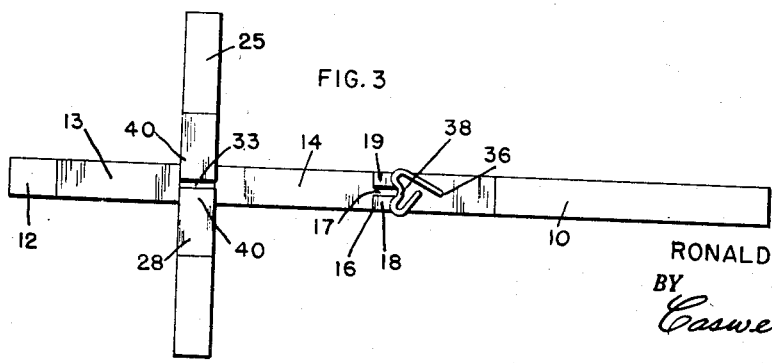
INVENTOR.
RONALD N. ANDERSON
BY
*Caswell & Lagaard*
ATTORNEYS Patented Aug. 3, 1954

2,685,156

UNITED STATES PATENT OFFICE 2,685,156

SCRAPER HOLDER

Ronald N. Anderson, St. Paul, Minn.

Application, June 8, 1953, Serial No. 360,095

6 Claims. (Cl. 51—218)

The herein disclosed invention relates to scraper holders and particularly to a holder for meat block scrapers for use in holding the scraper while the edge thereof is being sharpened.

An object of the invention resides in providing a scraper holder which can be readily applied to a table, meat block, or other suitable support without permanent attachment thereto and which securely holds the scraper in position while the same is being sharpened.

Another object of the invention resides in providing a base having an under surface adapted to rest on the table or meat block and further having a hook thereon and extending downwardly therefrom for engagement with the edge of the table or meat block and in further providing a rest on said base on which the handle of the scraper may rest while the blade is being sharpened.

A feature of the invention resides in providing an abutment at the end of the rest extending upwardly from the base against which the end of the scraper may abut.

Another object of the invention resides in providing a cross arm attached to the base and having an under surface coplanar with the under surface of said base and in further providing in said cross arm a slot of a width at the bottom to receive the handle and at the top of a width to receive the blade of the scraper.

A still further object of the invention resides in providing a projection on the abutment having a kerf therein for the reception of the blade and in further providing an extensible slide having a fork thereon for engagement with the upper end of the scraper blade.

Other objects of the invention reside in the novel combination and arrangement of parts and in the details of construction hereinafter illustrated and/or described.

In the drawings:

Fig. 1 is a perspective view of a scraper holder illustrating an embodiment of the invention.

Fig. 2 is a side view of the scraper holder.

Fig. 3 is a plan view of the structure shown in Fig. 2, while

Fig. 4 is an end view of the structure shown in Figs. 2 and 3.

The construction shown in the drawings comprises a base adapted to rest on a table or meat block and having a hook at one end for engagement with the edge of the table or meat block. The said base further has a rest on which the handle of the scraper may rest and an abutment at the rearward portion for engagement with the end of the scraper. A projection on the abutment is formed with a kerf which receives the edge of the scraper blade to hold the same in upright position. In addition, a fork mounted on a slider is provided which is movable to the uppermost edge of the scraper and serves to further hold the scraper in position. Attached to the base is a cross arm which also rests on the table or meat block and which has a slot in the same through which the handle and blade of the scraper extend.

For the purpose of illustrating the invention a conventional meat block scraper 20 has been shown which consists of a blade 21 and two curved blocks 22 attached to one end of the blade by means of screws 23 to form a handle 24 for the scraper.

The invention comprises a base 10 which is constructed from a board of wood or similar material and which is formed with a planiform under surface 11 adapted to rest upon the table or the meat block or on which the device is to be used. The forward portion of the base 10 is provided with a hook 12 which extends downwardly therefrom and engages the edge of the table or meat block and holds the holder from inward movement while the scraper is being sharpened. The forward portion of the base 10 is provided with a rest 13 having an upper surface 14 on which the handle of the scraper rests. At the rearward end of the base 10 is provided an abutment 15 against which the end of the scraper abuts and by means of which movement of the scraper in the direction of the holder is prevented while the scraper is being sharpened. This abutment has a projection 16 at the forward and upper portion of the same which is constructed with a kerf 17 dividing the said projection into two fingers 18 and 19. The blade 21 of the scraper is adapted to be received in this kerf and is engaged by said fingers.

Attached to the forward end of the base 10 is a cross arm 25 which is formed with a notch 26, best shown in Fig. 4. The base 10 at the rest 13 is similarly constructed with a notch 27 and the two notches receive juxtaposed portions of said cross arm and base and hold the same attached to one another. If desired, the parts may be glued or otherwise held from movement in any suitable manner. At the center of the cross arm 25, the same is constructed with a raised portion 28 which is formed with a slot 29. Slot 29 at its lower portion 31 is enlarged to receive the handle 24 of scraper 20 and has a bottom 32 lying in continuation of the surface 14 of rest 13. The upper portion 33 of this slot is reduced in width to form a kerf, similar to the kerf 17, and through which the blade 21 extends. By means of this construction two fingers 40 are formed on the portion 28 which engages the blade 21 of the scraper. The cross arm 25 is constructed with an under surface 34 which is coplanar with the surface 11 of the base 10 and which rests on the table or meat block and serves to hold the holder from tipping laterally while the blade is being sharpened.

It was found that where the blade was new and relatively long that tipping of the same while being sharpened would result. To overcome this objection, a slider 35 is employed, which is constructed of wire and which has two legs 36. These legs are received in holes 37 drilled in the upper portion of the abutment 15. The upper and forward portions of these legs are formed to provide a fork 38 which is adapted to receive the upper end of the blade and to prevent the blade from tipping when the same is sharpened. The fork 38 may be moved upwardly and downwardly by sliding the legs in the holes 37 and the friction between the abutment 15 of base 10 and legs 36 hold the fork in adjusted position.

In use the holder is merely set upon the table or meat block and slid rearwardly until the hook 12 engages the edge of the table or meat block. The scraper 20 is then inverted and applied to the holder by inserting the handle 24 into the enlarged portion 31 of slot 29 and the blade 21 into the narrow portion 33 of said slot. The scraper is then pushed rearwardly until the blade 21 is received in the kerf 17 of projection 16 and in the crotch of the fork 38 when the same is employed. The upper edge 39 of the blade may now be sharpened by filing in the customary manner.

The adavantages of the invention are manifest. The device is extremely simple in construction and can be readily fabricated from wood. The holder need not be attached to the table or meat block, the hook on the same holding the holder in position. The extensible fork on the slider serves to support the blade when the same is new and of relatively great length and thus prevents tipping of the blade as the sharpening progresses. With the invention it becomes impossible to file with the file in a backward direction since the scraper is merely withdrawn from the holder.

Changes in the specific form of the invention, as herein described, may be made within the scope of what is claimed without departing from the spirit of the invention.

Having described the invention, what is claimed as new and desired to be protected by Letters Patent is:

1. In a scraper holder for scrapers having a blade with a handle attached thereto, said holder comprising a base having an under surface for engagement with the surface of the object on which it rests, a hook on the outer end of said base for engagement with the edge of the object on which the scraper holder rests, a cross arm attached to said base and extending transversely thereof at a locality inwardly of said hook, said cross arm having an under surface coplanar with the under surface of said base, a rest on said base having an upwardly facing surface on which the handle of the scraper may rest when disposed in inverted position in the holder, said cross arm having a slot therethrough enlarged at its lower end to receive the handle of the scraper and reduced at its upper end to form fingers for engagement with the blade of the scraper, and an abutment on the base extending upwardly therefrom, said abutment being disposed at the end of said rest and engaging the end of the scraper blade and resisting inward movement of the blade during sharpening of the blade.

2. In a scraper holder for scrapers having a blade with a handle attached thereto, said holder comprising a base having an under surface for engagement with the surface of the object on which it rests, a hook on the outer end of said base for engagement with the edge of the object on which the scraper holder rests, a cross arm attached to said base and extending transversely thereof at a locality inwardly of said hook, said cross arm having an under surface coplanar with the under surface of said base, a rest on said base having an upwardly facing surface on which the handle of the scraper may rest when disposed in inverted position within the holder, said cross arm having a slot therethrough enlarged at its lower end to receive the handle of the scraper and reduced at its upper end to form fingers for engagment with the blade of the scraper, and an abutment on the base extending upwardly therefrom, said abutment being disposed at the end of said rest and fingers on said abutment straddling said blade and engaging the same on opposite sides thereof.

3. In a scraper holder for scrapers having a blade with a handle attached thereto, said holder comprising a base having an under surface for engagement with the surface of the object on which it rests, a hook on the outer end of said base for engagement with the edge of the object on which the scraper holder rests, a cross arm attached to said base and extending transversely thereof at a locality inwardly of said hook, said cross arm having a under surface coplanar with the under surface of said base, a rest on said base having an upwardly facing surface on which the handle of the scraper may rest when disposed in inverted position within the holder, said cross arm having a slot therethrough enlarged at its lower end to receive the handle of the scraper and reduced at its upper end to form fingers for engagement with the blade of the scraper, and an abutment on the base extending upwardly therefrom, said abutment being disposed at the end of said rest, said abutment having a kerf therein receiving the blade and forming fingers engaging the blade on the sides thereof.

4. In a scraper holder for scrapers having a blade with a handle attached thereto, said holder comprising a base having an under surface for engagement with the surface of the object on which it rests, a hook on the outer end of said base for engagement with the edge of the object on which the scraper holder rests, a cross arm attached to said base and extending transversely thereof at a locality inwardly of said hook, said cross arm having an under surface coplanar with the under surface of said base, a rest on said base having an upwardly facing surface on which the handle of the scraper may rest when disposed in inverted position within the holder, said cross arm having a slot therethrough enlarged at its lower end to receive the handle of the scraper and reduced at its upper end to form fingers for engagement with the blade of the scraper, and an abutment on the base extending upwardly therefrom, said abutment being disposed at the end of said rest, a forwardly extending projection on the upper end of said abutment, said projection having a kerf therein receiving the blade and forming fingers engaging the blade on the sides thereof.

5. In a scraper holder for scrapers having a blade with a handle attached thereto, said holder comprising a base having an under surface for engagement with the surface of the object on which it rests, a hook on the outer end of said base for engagement with the edge of the object on which the scraper holder rests, a cross arm attached to said base and extending transversely thereof at a locality inwardly of said hook, said cross arm having an under surface coplanar with the under surface of said base, a rest on said base having an upwardly facing surface on which the handle of the scraper may rest when disposed in inverted position within the holder, said cross arm having a slot therethrough enlarged at its lower end to receive the handle of the scraper and reduced at its upper end to form fingers for engagement with the blade of the scraper, and an abutment on the base extending upwardly therefrom, said abutment being disposed at the end of said rest, a vertically extending guideway in said abutment, a slider slidable in said guideway and a fork carried by said slider and engaging the end of said blade.

6. In a scraper holder for scrapers having a blade with a handle attached thereto, said holder comprising a base having an under surface for engagement with the surface of the object on which it rests, a hook on the outer end of said base for engagement with the edge of the object on which the scraper holder rests, said base having a rectangular notch therein, a cross arm received in said notch and extending transversely thereof at a locality inwardly of said hook, said cross arm having an under surface coplanar with the under surface of said base, a rest on said base having an upwardly facing surface on which the handle of the scraper may rest when disposed in inverted position within the holder, said cross arm having a slot therethrough enlarged at its lower end to receive the handle of the scaper and reduced at its upper end to form fingers for engagement with the blade of the scraper, and an abutment on the base extending upwardly therefrom, said abutment being disposed at the end of said rest and engaging the end of the scraper blade and resisting inward movement of the blade during sharpening of the blade.

References Cited in the file of this patent

UNITED STATES PATENTS

| Number | Name | Date |
| --- | --- | --- |
| 1,167,371 | Allen | Jan. 11, 1916 |
| 1,594,246 | Dechert | July 27, 1926 |
| 1,817,506 | Brisben | Aug. 4, 1931 |
| 2,534,486 | Van Loon | Dec. 19, 1950 |